RESETTABLE MONOSTABLE MULTIVIBRATOR
Filed Oct. 29, 1964
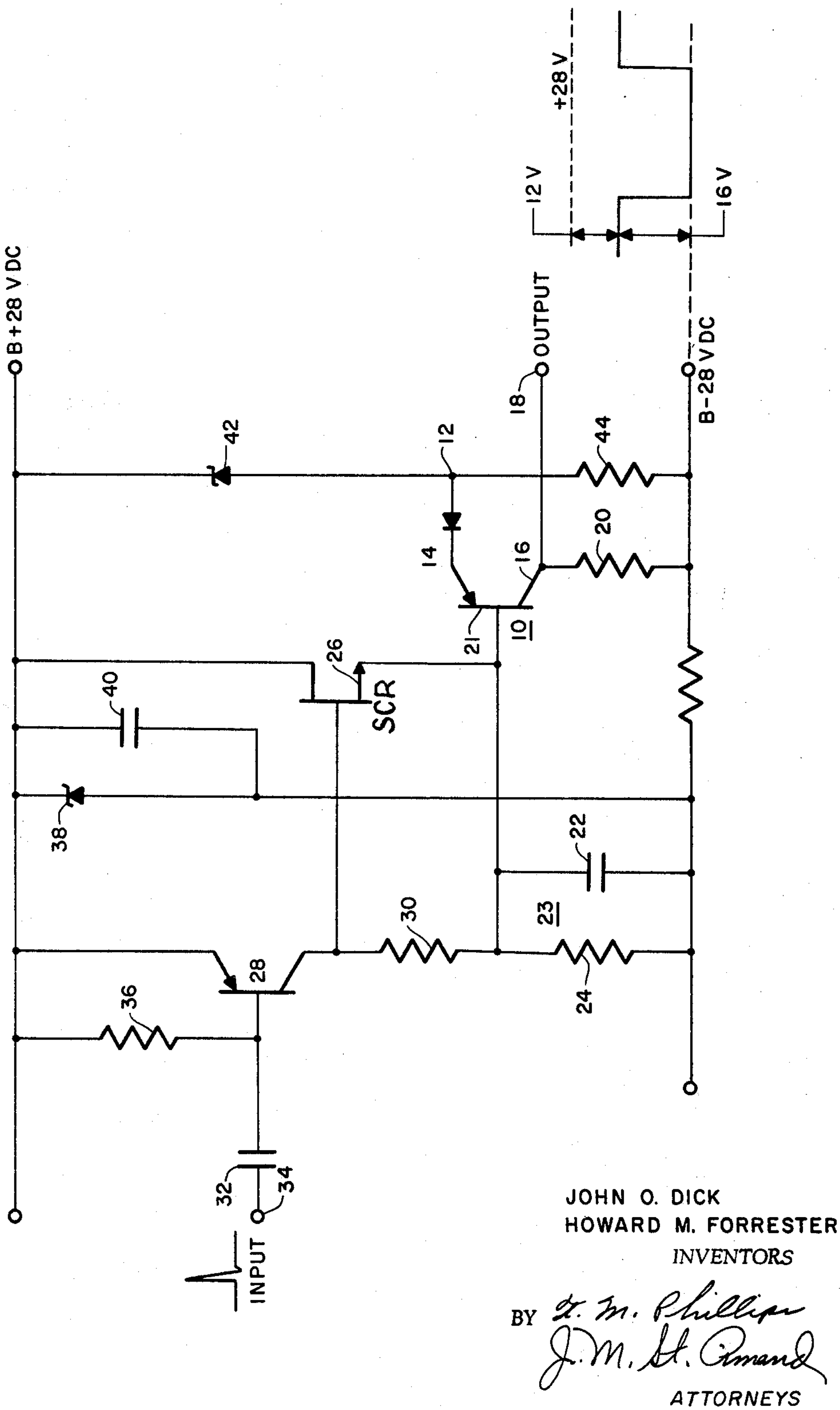
JOHN O. DICK
HOWARD M. FORRESTER
*INVENTORS*
BY *[signature]*
*[signature]*
*ATTORNEYS*

United States Patent Office 3,388,272

Patented June 11, 1968

3,388,272

RESETTABLE MONOSTABLE MULTIVIBRATOR

John O. Dick, Riverside, and Howard M. Forrester, Corona, Calif., assignors to the United States of America as represented by the Secretary of the Navy Filed Oct. 29, 1964, Ser. No. 407,592
3 Claims. (Cl. 307—273)

ABSTRACT OF THE DISCLOSURE

A monostable multivibrator which can by reset by the re-establishing of the charge on the charging capacitor when triggered regardless of its state of charge prior to that time.

The invention herein described may be manufactured and used by or for the Government of the United States of America for governmental purposes without the payment of any royalties thereon or therefor.

The present invention relates to a resettable monostable multivibrator and more particularly to a resettable monostable multivibrator which is retriggered during a pulse and continues the output waveform for the same precise period following the last trigger pulse.

In a two channel system wherein system operation relies upon the occurrence of a signal within a prescribed time period, in both channels, a multivibrator is often used to provide a square pulse in one channel to actuate a gate in such a manner that if a signal is received in the second channel within the time duration of the multivibrator pulse, the gate is said to be open or conducting and the second pulse is permitted to actuate or produce an output pulse for the system.

A conventional "one shot" or monostable multivibrator once triggered is insensitive to additional trigger pulses for the duration of the multivibrator period. This is due to the RC timing circuit wherein one-half of the multivibrator changes state and, through the RC network, causes the second half of the multivibrator to change state (from off to on or vice versa) for the period required for the charge on capacitor C to leak off through resistor R. In order to reset the multivibrator it is necessary to re-establish the original charge on capacitor C. This is not possible with the conventional multivibrator.

The present invention provides a monostable multivibrator which permits the re-establishing of the charge on the charging capacitor to B+ when triggered regardless of its state of charge prior to that time.

Accordingly, an object of the invention is to provide an improved monostable multivibrator which can be retriggered.

Other objects and many of the attendant advantages of this invention will become readily appreciated as the same becomes better understood by reference to the following detailed description when considered in connection with the accompanying drawing.

Referring now to the drawing wherein there is shown in the single figure a transistor 10, a PNP type, having its emitter connected to a positive bias source at 12 through a diode 14. The collector 16 is connected to output terminal 18 and to a B— voltage source through load resistor 20. Base 21 of transistor 10 is connected to RC circuit 23 which comprises capacitor 22 and resistor 24. A charging circuit is provided for capacitor 22 by means of a silicon controlled rectifier 26 connected in series therewith to B+ supply. Connected to the control electrode of silicon controlled rectifier 26 is the output of amplifier 28 at load resistor 30. The emitter of amplifier 28 is connected to B+ and the base is coupled through coupling capacitor 32 to input terminal 34 to which a trigger pulse may be applied. Biasing resistor 36 is connected between the base of amplifier 28 and B+ supply. Zener diode 38 with bypass capacitor 40 is connected across the B+ and B— supply to establish a reference voltage for RC network 23. Zener diode 42 is connected in series with resistor 44 across the B+ and B— supply to establish the reference bias voltage at junction 12.

In operation, with transistor 10 conducting, the voltage at terminal 18 will be near the bias voltage at junction 12. With the application of a trigger pulse at terminal 34, silicon controlled rectifier 26 will conduct to charge capacitor 22 to B+ potential. SCR 26 will cease to conduct and be re-set when capacitor 22 becomes charged to B+ potential and will be ready for the next trigger pulse. Base 21 is now at a potential above that of the bias voltage applied at junction 12, and due to the blocking action of diode 14 transistor 10 will cease to conduct. The voltage at output terminal 18 now drops as shown in the waveform to a potential near the B— supply. This condition will continue until sufficient charge leaks off capacitor 22 through resistor 24 to reduce the potential at base 21 to the bias potential at junction 12. At this potential, transistor 10 will again conduct and the voltage at terminal 18 will rise to near the voltage at junction 12.

If a new pulse were applied to terminal 34 before capacitor 22 had discharged to the bias potential at junction 12, capacitor 22 will be recharged to the B+ supply voltage and the multivibrator will begin a new complete cycle. The output waveform at terminal 18 will continue until capacitor 22 discharges down to the potential at junction 12. Rectifier 14 is inserted to protect the base-emitter junction of transistor 10 from the high reverse voltage cut off pulse which will exceed the reverse base-emitter rating of transistor 10.

The following components and operating values have been found to operate satisfactorily in the practice of the invention.

| | | |
|---|---|---|
| Transistor **10** | | 2N1307 |
| SCR **26** | | 2N885 |
| Transistor **28** | | 2N1131 |
| Zener diode 38 | | 1N968 |
| Zener diode 42 | | 1N964 |
| Diode **14** | | 1N645 |
| Capactor **22** | mf | .22 |
| Capacitor **32** | do | .01 |
| Capacitor **40** | do | 15 |
| Resistor **20** | ohms | 12,000 |
| Resistor **24** | do | 220,000 |
| Resistor 36 | do | 22,000 |
| Resistor 44 | do | 15,000 |
| B+ supply | V. DC | +28 |
| B— supply | do | —28 |

Obviously many modifications and variations of the present invention are possible in the light of the above teachings. It is therefore to be understood that within the scope of the appended claims the invention may be practiced otherwise than as specifically described.

What is claimed is:

1. A monostable multivibrator circuit comprising:

(a) a transistor having a base, a collector and an emitter, (b) means providing a first, a second and a third source of operating voltage, said first source being of a greater positive potential than said second source but of the same polarity and both of said first and second source being of an opposite polarity to said third source, (c) means connecting said emitter with said second source, (d) means connecting said collector with said third source,
(e) a storage capacitor connector between said base and said third source,
(f) a charging circuit connected between said storage capacitor and said first source,
(g) means providing an input circuit for applying trigger pulses to said charging circuit,
(h) said charging circuit being responsive to a trigger pulse to charge said storage capacitor to the potential of said first source, said charge being sufficient to prevent said transistor from conducting,
(i) discharge means connected to said storage capacitor for discharging said storage capacitor to a potential which will permit said transistor to change to a state of conducting unless another pulse is applied to said charging means before said storage capacitor discharges to the potential of said second voltage source to recharge said storage capacitor to the potential of said first source,
(j) and an output terminal coupled to said collector where the output waveform appears resulting from the two conducting condition of said transistor.

2. A monostable multivibrator circuit comprising:
(a) a normally conducting transistor having a base, a collector and an emitter,
(b) means providing a positive source of operating voltage and a negative source of operating voltage,
(c) a Zener diode connected in series with a resistor between said positive and negative operating voltage sources,
(d) said emitter being connected to a point intermediate said Zener diode and said resistor,
(e) said collector being connected to an output terminal and through a load resistor to said negative voltage source,
(f) a storage capacitor connected between said base and said negative voltage source,
(g) a normally non-conducting silicon controlled rectifier connected between said storage capacitor and said positive voltage source,
(h) means providing an input circuit coupled to the control electrode of said silicon controlled rectifier for applying trigger pulses thereto,
(i) said silicon controlled rectifier being responsive to a trigger pulse to conduct for a period of sufficient time to charge said storage capacitor to the potential of said positive operating voltage, said potential being sufficient to change the operation of said transistor from conducting to non-conducting,
(j) discharge means connected to said storage capacitor for discharging said storage capacitor to a potential which will permit said transistor change from a state of non-conducting to conducting until another pulse is applied to the control electrode of said silicon controlled rectifier,
(k) said changing of states of conduction of said transistor causing a rectangular waveform to appear at said output terminal.

3. A monostable multivibrator circuit which permits re-triggering, the combination comprising:
(a) a positive source of operating voltage,
(b) a negative source of operating voltage,
(c) a normally non-conducting silicon controlled rectifier,
(d) a storage capacitor connected in series with said silicon controlled rectifier between said positive and negative sources of operating voltage,
(e) means providing an input circuit for applying trigger pulses to said silicon controlled rectifier to cause it to conduct and charge said storage capacitor when a pulse is applied thereto,
(f) a transistor in a normally conducting condition coupled to said storage capacitor and being responsive to voltage of said storage capacitor when charged to said positive operating voltage to become non-conducting,
(g) discharge circuit means coupled to said storage capacitor to discharge said storage capacitor to a potential which permits said transistor to start conducting until another pulse is applied to said silicon controlled rectifier.

References Cited

UNITED STATES PATENTS

| | | | |
|---|---|---|---|
| 3,033,994 | 5/1962 | Fujimoto et al. | 307—88.5 |
| 3,068,367 | 12/1962 | Brown et al. | 307—88.5 |
| 3,093,756 | 6/1963 | Rywak | 307—88.5 |
| 3,217,179 | 11/1965 | Okuda et al. | 307—88.5 |
| 3,282,632 | 11/1966 | Arsem | 307—88.5 |

JOHN S. HEYMAN, *Primary Examiner.*